US012437934B2

(12) United States Patent
Tanaka et al.

(10) Patent No.: US 12,437,934 B2
(45) Date of Patent: Oct. 7, 2025

(54) CAPACITOR WITH NEGATIVE ELECTRODE FOIL INCLUDING CARBON LAYER

(71) Applicant: NIPPON CHEMI-CON CORPORATION, Tokyo (JP)

(72) Inventors: Yuki Tanaka, Tokyo (JP); Kazuhiro Nagahara, Tokyo (JP); Kazuya Koseki, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 91 days.

(21) Appl. No.: 18/275,483

(22) PCT Filed: Jan. 20, 2022

(86) PCT No.: PCT/JP2022/001993
§ 371 (c)(1),
(2) Date: Aug. 2, 2023

(87) PCT Pub. No.: WO2022/172720
PCT Pub. Date: Aug. 18, 2022

(65) Prior Publication Data
US 2024/0321524 A1 Sep. 26, 2024

(30) Foreign Application Priority Data

Feb. 9, 2021 (JP) .................................. 2021-019021
Feb. 9, 2021 (JP) .................................. 2021-019023

(51) Int. Cl.
*H01G 9/02* (2006.01)
*H01G 9/042* (2006.01)
*H01G 9/055* (2006.01)

(52) U.S. Cl.
CPC ............... *H01G 9/02* (2013.01); *H01G 9/042* (2013.01); *H01G 9/055* (2013.01)

(58) Field of Classification Search
None
See application file for complete search history.

(56) References Cited

U.S. PATENT DOCUMENTS

2004/0264108 A1* 12/2004 Yamazaki ............... H01G 9/02
361/502
2015/0022951 A1 1/2015 Tanaka et al.
(Continued)

FOREIGN PATENT DOCUMENTS

JP 2004349586 A * 12/2004 ............... H01G 9/02
JP 2006-80111 A 3/2006
(Continued)

OTHER PUBLICATIONS

Translation JP 2006080111A.*
(Continued)

*Primary Examiner* — Eric W Thomas
(74) *Attorney, Agent, or Firm* — WHDA, LLP

(57) ABSTRACT

A capacitor includes a positive electrode foil, a negative electrode foil, and a separator disposed between the positive and negative electrode foils. The negative electrode foil includes a carbon layer, and the separator is in contact with the carbon layer. The separator has a density [symbol: $\rho$, unit: g/cm$^3$] satisfying the formula:

$$\rho \geq 4.0 \times 10^{-3} \times WPA,$$

where WPA is the amount of carbon per square centimeter of the separator [unit: $\mu$g/cm$^2$].

11 Claims, 6 Drawing Sheets

(56) References Cited

U.S. PATENT DOCUMENTS

| | | | |
|---|---|---|---|
| 2018/0005768 A1* | 1/2018 | Shimizu | H01G 11/84 |
| 2021/0193395 A1 | 6/2021 | Koseki et al. | |
| 2022/0262576 A1 | 8/2022 | Koseki et al. | |
| 2023/0360862 A1 | 11/2023 | Koseki et al. | |

FOREIGN PATENT DOCUMENTS

| | | |
|---|---|---|
| WO | 2013/069146 A1 | 5/2013 |
| WO | 2019/240041 A1 | 12/2019 |
| WO | 2020/059609 A1 | 3/2020 |
| WO | 2021/002174 A1 | 1/2021 |

OTHER PUBLICATIONS

Notification Concerning Transmittal of International Preliminary Report on Patentability (Forms PCT/IB/326) issued in counterpart International Application No. PCT/JP2022/001993 mailed Aug. 24, 2023 with Forms PCT/IB/373 and PCT/ISA/237. (14 pages).

Office Action dated Nov. 5, 2024, issued in counterpart JP Application No. 2021-019021, with English translation. (8 pages).

Office Action dated Nov. 5, 2024, issued in counterpart JP Application No. 2021-019023, with English translation. (8 pages).

International Search Report dated Mar. 22, 2022, issued in counterpart International Application No. PCT/JP2022/001993, with English Translation. (5 pages).

Written Opinion of the International Searching Authority (Form PCT/ISA/237) dated Mar. 22, 2022, issued in counterpart International Application No. PCT/JP2022/001993. (4 pages).

Extended European Search Report dated May 9, 2025, issued in counterpart EP Application No. 22752551.6. (9 pages).

Office Action dated Apr. 29, 2025, issued in counterpart KR Application No. 10-2023-7026586, with English translation. (11 pages).

Decision of Refusal dated Jun. 24, 2025, issued in counterpart JP Application No. 2021-019023, with English translation. (14 pages).

* cited by examiner

| SNo. | Density [g/cm³] | Thickness [μm] | Conduction resistance value [Ω] ||||||||||
|---|---|---|---|---|---|---|---|---|---|---|---|---|
| | | | No slurry | Slurry 1 | Slurry 2 | Slurry 3 | Slurry 4 | Slurry 5 | Slurry 6 | Slurry 7 | Slurry 8 | Slurry 9 | Slurry 10 |
| S 1 | 0.5 | 30 | O.R. | O.R. | O.R. | O.R. | O.R. | 2.60.E-06 | 2.00.E+05 | 2.37.E+03 | 5.23.E+02 | 2.25.E+02 | 1.79.E+01 |
| S 2 | 0.5 | 60 | O.R. | O.R. | O.R. | O.R. | O.R. | O.R. | O.R. | O.R. | O.R. | O.R. | 6.10.E+04 |
| S 3 | 0.75 | 20 | O.R. | O.R. | O.R. | O.R. | O.R. | O.R. | O.R. | O.R. | O.R. | O.R. | O.R. |
| S 4 | 0.85 | 15 | O.R. | O.R. | O.R. | O.R. | O.R. | O.R. | O.R. | O.R. | O.R. | O.R. | O.R. |
| S 5 | 0.95 | 25 | O.R. | O.R. | O.R. | O.R. | O.R. | O.R. | O.R. | O.R. | O.R. | O.R. | O.R. |
| S 6 | 0.75 | 60 | O.R. | O.R. | O.R. | O.R. | O.R. | O.R. | O.R. | O.R. | O.R. | O.R. | O.R. |
| S 7 | 0.75 | 30 | O.R. | O.R. | O.R. | O.R. | O.R. | O.R. | O.R. | O.R. | O.R. | O.R. | O.R. |
| S 8 | 0.5 | 30 | O.R. | O.R. | O.R. | O.R. | O.R. | 8.81.E+06 | 2.80.E+05 | 4.15.E+04 | 6.04.E+03 | 2.19.E+02 | 1.01.E+01 |
| S 9 | 0.5 | 60 | O.R. | O.R. | O.R. | O.R. | O.R. | 4.75.E+08 | 9.44.E+07 | 1.44.E+06 | 5.06.E+04 | 2.65.E+03 | 4.80.E+02 |
| S 10 | 0.35 | 50 | O.R. | O.R. | O.R. | O.R. | O.R. | 3.91.E+08 | 2.72.E+05 | 4.14.E+04 | 4.54.E+03 | 1.67.E+03 | 6.27.E+01 |
| S 11 | 0.4 | 50 | O.R. | O.R. | O.R. | O.R. | O.R. | O.R. | 7.63.E+06 | 6.25.E+04 | 1.05.E+04 | 1.84.E+03 | 1.34.E+02 |
| S 12 | 0.45 | 50 | O.R. | O.R. | O.R. | 2.76.E+08 | 3.30.E+08 | 1.59.E+08 | 5.39.E+07 | 1.11.E+06 | 3.11.E+04 | 4.55.E+03 | 2.58.E+02 |
| S 13 | 0.5 | 50 | O.R. | O.R. | O.R. | O.R. | O.R. | 1.41.E+06 | 1.42.E+05 | 5.97.E+06 | 9.40.E+04 | 7.24.E+03 | 1.63.E+02 |
| S 14 | 0.28 | 40 | O.R. | O.R. | O.R. | 3.68.E+08 | 4.22.E+08 | 1.59.E+08 | 5.39.E+07 | 9.62.E+03 | 3.04.E+03 | 1.39.E+03 | 2.57.E+02 |
| S 15 | 0.45 | 30 | O.R. | O.R. | O.R. | O.R. | O.R. | 2.35.E+08 | 1.35.E+08 | 5.12.E+04 | 8.95.E+07 | 3.70.E+04 | 7.20.E+04 |
| S 16 | 0.45 | 40 | O.R. | O.R. | O.R. | 3.39.E+08 | 2.64.E+08 | 1.38.E+08 | 9.17.E+07 | 6.36.E+07 | 1.83.E+08 | 6.34.E+07 | 1.36.E+08 |
| S 17 | 0.45 | 50 | O.R. | O.R. | O.R. | O.R. | O.R. | O.R. | O.R. | 9.08.E+07 | 1.33.E+08 | 6.40.E+07 | 6.04.E+04 |
| S 18 | 0.5 | 70 | O.R. | O.R. | O.R. | O.R. | O.R. | O.R. | O.R. | O.R. | O.R. | O.R. | O.R. |

| SNo. | Separator classification | Density [g/cm³] | Thickness [μm] | Carbon adhesion amount CA: 100 [μg/cm²] ||| Carbon adhesion amount CA: 125 [μg/cm²] |||
|---|---|---|---|---|---|---|---|---|---|
| | | | | Sheet resistance [Ω] || Sheet resistance difference [Ω] | Sheet resistance [Ω] || Sheet resistance difference [Ω] |
| | | | | First surface | Second surface | | First surface | Second surface | |
| S2 | Kraft paper | 0.5 | 60 | 1.63.E+05 | 1.00.E+08 | 9.98.E+07 | 6.34.E+04 | 1.00.E+08 | 9.99.E+07 |
| S3 | Kraft paper | 0.75 | 20 | 4.90.E+03 | 1.00.E+08 | 1.00.E+08 | 2.67.E+03 | 1.00.E+08 | 1.00.E+08 |
| S4 | Kraft paper | 0.85 | 15 | 5.64.E+03 | 1.00.E+08 | 1.00.E+08 | 2.54.E+03 | 1.00.E+08 | 1.00.E+08 |
| S6 | Kraft paper | 0.75 | 60 | 8.82.E+03 | 1.00.E+08 | 1.00.E+08 | 5.60.E+03 | 1.00.E+08 | 1.00.E+08 |
| S7 | Kraft paper | 0.75 | 30 | 3.82.E+03 | 1.00.E+08 | 1.00.E+08 | 3.00.E+03 | 1.00.E+08 | 1.00.E+08 |
| S10 | Manila paper | 0.35 | 50 | 3.91.E+06 | 5.98.E+06 | 2.07.E+06 | 1.41.E+06 | 2.41.E+06 | 1.00.E+06 |
| S11 | Manila paper | 0.4 | 50 | 2.25.E+06 | 1.00.E+08 | 9.78.E+07 | 6.67.E+05 | 1.95.E+06 | 1.28.E+06 |
| S12 | Manila paper | 0.45 | 50 | 7.76.E+06 | 1.00.E+08 | 9.22.E+07 | 2.19.E+06 | 1.07.E+07 | 8.55.E+06 |
| S14 | Chemical fiber paper | 0.28 | 40 | 4.47.E+06 | 4.63.E+06 | 1.56.E+05 | 2.33.E+06 | 2.40.E+06 | 7.00.E+04 |

FIG.6

CAPACITOR WITH NEGATIVE ELECTRODE FOIL INCLUDING CARBON LAYER

TECHNICAL FIELD

The present disclosure relates to a capacitor including a negative electrode foil in which a carbon layer is formed.

BACKGROUND ART

An electrolytic capacitor includes a positive electrode foil, a negative electrode foil, and a separator disposed between the positive electrode foil and the negative electrode foil, and can store electricity. In such an electrolytic capacitor, it is known that a carbon layer is formed on a negative electrode foil (for example, Patent Literature 1). The carbon layer has an effect of increasing the electrostatic capacitance of the negative electrode foil, for example.

CITATION LIST

Patent Literature

Patent Literature 1: JP 2006-80111 A

SUMMARY OF INVENTION

Technical Problem

In a capacitor such as an electrolytic capacitor, it is necessary to prevent a short circuit between a positive electrode foil and a negative electrode foil. A large amount of carbon separated from the negative electrode foil can cause a concern about an adverse effect on the insulating function of the separator. Patent Literature 1 does not disclose or suggest such a problem, and the configuration disclosed in Patent Literature 1 cannot solve such a problem.

Therefore, an object of the present disclosure is to provide a separator suitable for a capacitor including, for example, a negative electrode foil in which a carbon layer is formed, or to provide a capacitor including this separator.

Solution to Problem

According to one aspect of the present disclosure, a capacitor includes a positive electrode foil, a negative electrode foil, and a separator disposed between the positive electrode foil and the negative electrode foil. The negative electrode foil includes a carbon layer, and the separator is in contact with the carbon layer and has a density [symbol: $\rho$, unit: g/cm$^3$] satisfying the following formula.

$$\rho \geq 4.0 \times 10^{-3} \times WPA$$

Herein, WPA is the amount of carbon per square centimeter of the separator [unit: μg/cm$^2$].

In the capacitor, the separator may be a kraft separator in contact with the carbon layer.

In the capacitor, the separator may include carbon equal to or less than the amount of carbon on a negative-electrode side surface in contact with the negative electrode foil.

In the capacitor, the carbon may adhere only to the negative-electrode side surface.

In the capacitor, the carbon may be disposed on the entire negative-electrode side surface, or may be partially disposed on the cathode side surface.

Advantageous Effects of Invention

According to the above aspect of the present disclosure, for example, the following effects can be obtained.

(1) The separator has a density of $4.0 \times 10^{-3} \times WPA$ or more, and thus it is possible to provide a large short-circuit suppressing effect between electrodes of a capacitor including a negative electrode foil in which a carbon layer is formed, in various types and in a wide range of thickness of the separator. The separator has a qualitatively different effect of suppressing a decrease in insulation due to adhering carbon, and is suitable for a capacitor including a negative electrode foil in which a carbon layer is formed.

(2) When the capacitor has a kraft separator, it is possible to provide a larger short-circuit suppressing effect than separators of other paper types having the same density and the same thickness as those of the kraft separator. The kraft separator has a qualitatively different effect of suppressing a decrease in insulation due to adhering carbon, and is suitable for a capacitor including a negative electrode foil in which a carbon layer is formed.

MODE (S) FOR CARRYING OUT THE INVENTION

Figure 1:
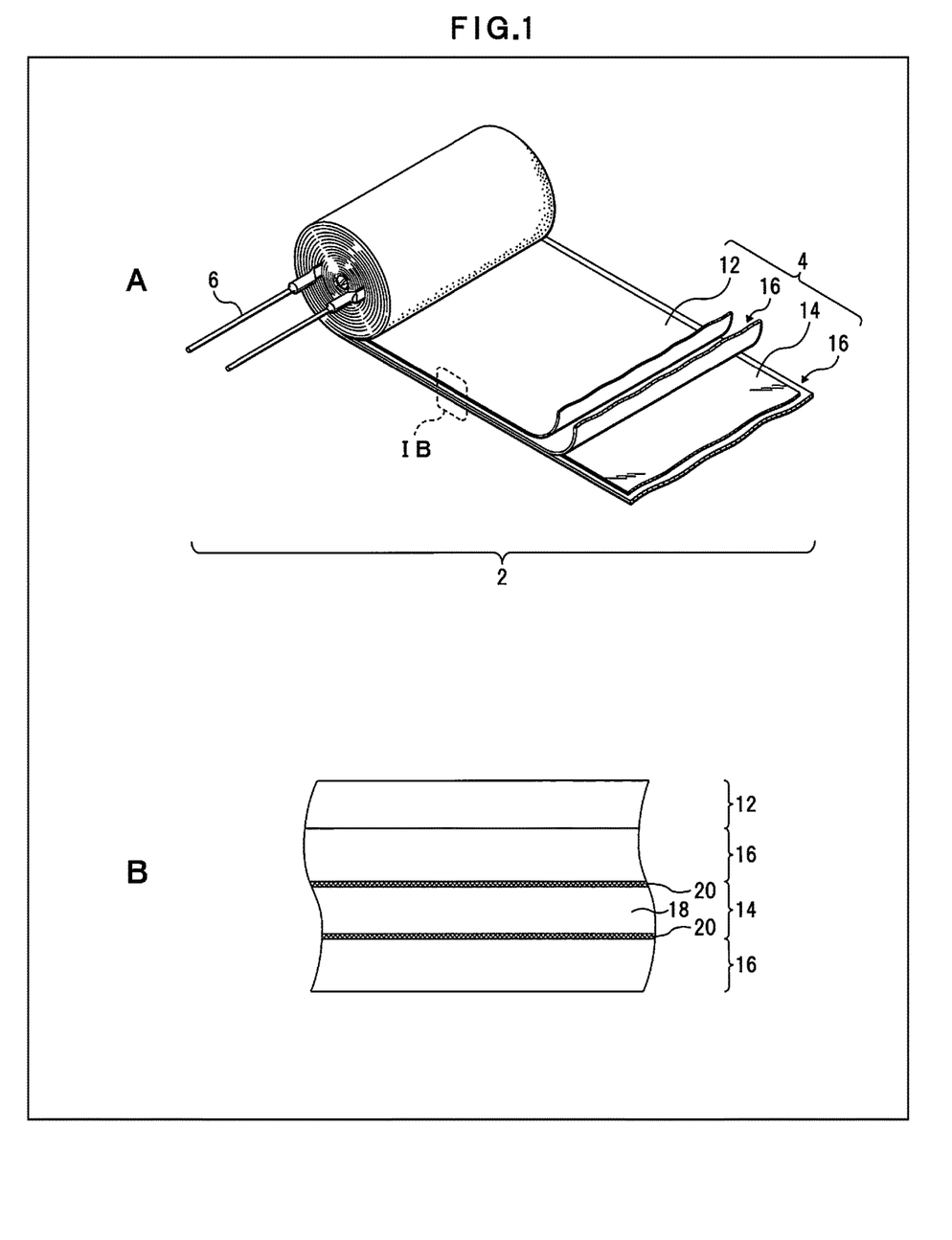
FIG. 1 is a diagram illustrating an example of a capacitor according to an embodiment.

FIG. 1 illustrates an example of a capacitor according to an embodiment. In FIG. 1, an exterior case, a sealing member, and an electrolyte of the capacitor are omitted. B of FIG. 1 is an enlarged view of a region IB illustrated in A of FIG. 1. A configuration illustrated in FIG. 1 is an example of the present disclosure, and the present disclosure is not limited to such a configuration.

A capacitor 2 is an example of an electronic component, and is, for example, an electrolytic capacitor. The capacitor 2 includes a capacitor element 4, terminal leads 6, an exterior case, and a sealing member. The terminal leads 6 are connected to the capacitor element 4 and protrude from one end face of the capacitor element 4. The capacitor element 4 and a part of the terminal leads 6 are inserted into the exterior case. The sealing member is installed in an opening of the exterior case, and the inside of the exterior case is sealed. That is, the capacitor element 4 and a part of the terminal leads 6 are sealed inside the exterior case. The terminal leads 6 penetrate a through hole in the sealing member and protrude from the sealing member.

The capacitor element 4 includes a positive electrode foil 12, a negative electrode foil 14, a separator 16, and an electrolyte. The positive electrode foil 12 and the negative electrode foil 14 are connected to respective different terminal leads 6. The positive electrode foil 12, the negative electrode foil 14, and the separator 16 are stacked and wound such that the separator 16 is disposed between the positive electrode foil 12 and the negative electrode foil 14, thereby forming a wound element. This wound element forms the capacitor element 4. The gap in the capacitor element 4 and the separator 16 are filled with the electrolyte. The electrolyte may be an electrolytic solution or a gel electrolyte, may include the electrolytic solution and the gel electrolyte, or may include the electrolytic solution or the gel electrolyte, and a solid electrolyte. The solid electrolyte includes, for example, a conductive polymer.

The positive electrode foil 12 constitutes an electrode on the positive-electrode side of the capacitor 2. The positive electrode foil 12 is, for example, a valve action metal foil such as a tantalum foil or an aluminum foil, and is, for example, a strip-shaped foil. The surface of the positive electrode foil 12 has irregularities formed by etching, for example, and includes a dielectric oxide film formed by chemical conversion treatment, for example. The irregularities formed by etching have, for example, a porous structure.

The negative electrode foil 14 constitutes an electrode on the negative-electrode side of the capacitor 2. The negative electrode foil 14 is, for example, a strip-shaped foil, and includes a body foil 18 and a carbon layer 20. The body foil 18 is, for example, a valve action metal foil such as an aluminum foil, a tantalum foil, a niobium foil, a titanium foil, a hafnium foil, a zirconium foil, a zinc foil, a tungsten foil, a bismuth foil, or an antimony foil. The surface of the body foil 18 has irregularities formed by etching, for example, and the surface area of the body foil 18 is increased. The surface of the body foil 18 may include, for example, tunnel-shaped or sponge-like etching pits, and the tunnel-shaped or sponge-like etching pits may form irregularities.

The carbon layer 20 is disposed on both surfaces of the body foil 18, for example. The carbon layer 20 may be disposed only on one surface of the body foil 18. The carbon layer 20 is in close contact with irregularities of the body foil 18. That is, the carbon layer 20 is disposed outside the body foil 18, and the negative electrode foil 14 has a two-layer structure including the body foil 18 and the carbon layer 20 or a three-layer structure in which the carbon layers 20 are disposed on both surfaces of the body foil 18. The carbon layer 20 includes a carbon material as a main material, and further includes a binder and a dispersant as additives.

The carbon material is, for example, spherical carbon. Each spherical carbon functions as an active material. Therefore, the carbon layer 20 includes an electric double layer active material layer made of spherical carbon, and increases the electrostatic capacitance of the negative electrode foil 14.

Examples of the spherical carbon include carbon black such as Ketjen black, acetylene black, channel black, or thermal black.

The carbon material may be a mixture including the described spherical carbon and graphite. The graphite is, for example, natural graphite, artificial graphite, graphitized Ketjen black, or the like, and has a shape such as scaly, scale-like, massive, earthy, spherical, or flaky. The graphite is preferably scaly or flaky, and the aspect ratio of the minor axis to the major axis of the graphite is preferably in the range of 1:5 to 1:100. The scaly or flaky graphite having the above-described aspect ratio can press spherical carbon into, for example, an etching pit, and a part of the carbon layer 20 can be formed even inside the etching pit. Therefore, the carbon layer 20 can be in firmly close contact with the body foil 18 by the anchor effect.

When the average particle size of the graphite is 6 μm or more and 10 μm or less, such effects as suppressing a decrease in electrostatic capacitance due to a high temperature environmental load can be obtained. When the average particle size of the graphite is 6 μm or less, the electrostatic capacitance of the capacitor 2 can be increased while suppressing a decrease in electrostatic capacitance due to a high temperature environmental load. In addition, when the average particle size of the graphite is 6 μm or less, the graphite is easily retained in the carbon layer 20, and the amount of the binder added can be suppressed. Suppressing the amount of the binder added increases the ratio of the carbon material. Therefore, the electric resistance of the negative electrode foil 14 can be reduced, and the equivalent series resistance (ESR) of the capacitor 2 can be reduced. The described numerical value of the average particle size is a numerical value based on a median diameter, so-called D50.

In a case where the carbon material is a mixture of graphite and spherical carbon, in order to obtain an action by combined use of graphite and spherical carbon, a mass ratio of graphite to the mixture of graphite and spherical carbon [mass of graphite/(mass of graphite+mass of spherical carbon)] is, for example, in a range of 25% or more and 90% or less.

The binder is, for example, styrene-butadiene rubber, polyvinylidene fluoride, or polytetrafluoroethylene, and bonds graphite and spherical carbon. The dispersant is, for example, sodium carboxymethylcellulose. The carbon layer 20 is made of, for example, an aqueous solution in which spherical carbon is dispersed. The dispersant can disperse the spherical carbon in an aqueous solution.

The separator 16 is disposed between the positive electrode foil 12 and the negative electrode foil 14 to prevent a short circuit between the positive electrode foil 12 and the negative electrode foil 14. The separator 16 is in contact with the positive electrode foil 12 and the carbon layer 20 of the negative electrode foil 14. The separator 16 is an insulating material, and includes a separator member such as kraft, Manila hemp, esparto, hemp, rayon, cellulose, or a mixed material thereof. The separator 16 preferably includes kraft, and may include other separator members such as Manila hemp, esparto, hemp, rayon, cellulose, and a mixed material thereof.

The separator 16 is preferably a kraft separator 16. The kraft separator 16 is a separator 16 made of only kraft, a separator 16 having a content of kraft of, for example, more than 50% by mass, or a multilayer separator 16 including a kraft layer made of only kraft or having a content of kraft of, for example, more than 50% by mass and a non-kraft layer made of a material other than kraft. From the results of a first experiment described below, the kraft separator 16 to which carbon is attached has a smaller reduction amount of conduction resistance and a higher insulation than other separators 16 to which carbon is attached. Therefore, in the capacitor 2 including the negative electrode foil 14 in which the carbon layer 20 is formed, the kraft separator 16 is considered to have a greater effect of suppressing short circuit than other separators 16.

The separator 16 preferably has a density [symbol: ρ, unit: g/cm³] satisfying the following formula (1).

$$\rho \geq 4.0 \times 10^{-3} \times WPA \qquad (1)$$

Herein, WPA is the amount of carbon per square centimeter of the separator [unit: μg/cm²]. WPA is, for example, a set adhesion amount of carbon set at a design stage of the capacitor 2. For example, in the case of designing the capacitor 2 having sufficient insulation between the electrodes even when 100 μg/cm² of carbon adheres to the separator 16, WPA is set to, for example, 100 μg/cm², and the density of the separator 16 is preferably set to 0.4 g/cm³ or more from the following formula (2).

$$\rho \geq 4.0 \times 10^{-3} \times 100 = 0.4 \qquad (2)$$

When the density of the separator 16 satisfies the formula (1), it can be expected from the results of a second experiment described below that a large short-circuit suppressing effect between the electrodes can be obtained in various types and a wide range of thickness of the separator 16. In other words, when WPA satisfies the following formula (3), a large short-circuit suppressing effect between the electrodes can be expected in various types and a wide range of thickness of the separator 16.

$$WPA \leq 250\rho \qquad (3)$$

When WPA is represented by the unit "g/cm²" in order to unify the unit of mass, formula (1) and formula (3) are formula (4) and formula (5), respectively.

$$\rho \geq 4.0 \times 10^{-3} \times WPA \qquad (4)$$

$$WPA \leq 2.5 \times 10^{-4} \times \rho \qquad (5)$$

The WPA may be the set adhesion amount described above in the design stage of the capacitor 2, or may be an actual carbon adhesion amount in the capacitor 2 or an amount larger than the actual carbon adhesion amount.

The terminal leads 6 are formed of, for example, a metal having good conductivity. One terminal lead 6 is a positive-electrode side terminal, and is connected to the positive electrode foil 12 by, for example, cold welding or stitch connection. Another terminal lead 6 is a negative-electrode side terminal, and is connected to the negative electrode foil 14 by, for example, cold welding or stitch connection.

The sealing member is formed of, for example, insulating rubber. The sealing member has insertion holes at positions corresponding to the terminal leads 6. The terminal leads 6 of the capacitor element 4 pass through the insertion holes in the sealing member and are exposed to the outside of the capacitor 2.

The exterior case is, for example, a bottomed cylindrical aluminum case.

[Step of Producing Capacitor]

The step of producing the capacitor 2 is an example of the method for producing a capacitor of the present disclosure, and includes, for example, a step of producing the positive electrode foil 12, a step of producing the negative electrode foil 14, a step of producing the separator 16, a step of producing the capacitor element 4, and a step of sealing the capacitor element 4.

In the step of producing the positive electrode foil 12, the surface of a valve action metal foil such as a tantalum foil or an aluminum foil is etched to form irregularities on the surface of the valve action metal foil. The valve action metal foil after the etching treatment is subjected to a chemical conversion treatment to form a dielectric oxide film on the surface of the valve action metal foil. The valve action metal foil is etched, for example, by applying an electric current to the valve action metal foil immersed in an aqueous chloride solution such as hydrochloric acid or saline. The current to be applied may be a direct current or an alternating current. The valve action metal foil is chemically converted, for example, by applying a voltage to the valve action metal foil immersed in an electrolytic solution including a solution of ammonium borate, ammonium borate, ammonium phosphate, ammonium adipate, or the like. The chemically converted valve action metal foil is cut to produce the positive electrode foil 12.

In the step of producing the negative electrode foil 14, the surface of a valve action metal foil such as an aluminum foil, a tantalum foil, a niobium foil, a titanium foil, a hafnium foil, a zirconium foil, a zinc foil, a tungsten foil, a bismuth foil, or an antimony foil is etched to form irregularities on the surface of the valve action metal foil. The etching on the side of the negative electrode foil 14 may be the same as or different from the etching on the side of the positive electrode foil 12. The carbon layer 20 is formed on the valve action metal foil after the etching treatment, and the valve action metal foil on which the carbon layer 20 is formed is cut to produce the negative electrode foil 14.

The carbon layer 20 is produced as follows. The carbon material, the binder, and the dispersant described above are added to a diluent, and mixed by a dispersion treatment such as a mixer, jet mixing, ultracentrifugation, or ultrasonic treatment to form a slurry. The binder is added, for example, in an amount necessary for bonding the carbon material, and the dispersant is added, for example, in an amount necessary for dispersing the carbon material. Therefore, the amounts of the binder added and the dispersant added are smaller than the amount of the carbon material added. When graphite is used as the carbon material, the graphite may be pulverized by a pulverizer such as a bead mill or a ball mill, and the average particle size of the graphite may be adjusted before being added to the diluent.

Examples of the diluent include an alcohol, a hydrocarbon-based solvent, an aromatic-based solvent, an amide-based solvent, water, and a mixture thereof. The alcohol is, for example, methanol, ethanol, or 2-propanol. The amide-based solvent is, for example, N-methyl-2-pyrrolidone (NMP) or N, N-dimethylformamide (DMF).

The slurry is applied to the valve action metal foil after the etching treatment. After the slurry is dried, the slurry is pressed. The pressing aligns the carbon material. When the carbon material includes graphite, the graphite is aligned by pressing, and the graphite is deformed along the irregularities of the valve action metal foil. When graphite is pressure-welded on the irregularities, spherical carbon is pushed into pores of the valve action metal foil. This causes the slurry to be in close contact with the valve action metal foil, providing the carbon layer 20 in close contact with the body foil 18.

In the step of producing the separator 16, the separator member described above is cut to produce the separator 16.

In the design stage of the capacitor 2, the maximum amount or the allowable amount of separated carbon separated from the carbon layer 20 may be set, the set adhesion amount described above may be set from the maximum amount or the allowable amount, and the density of the separator 16 may be set from the set adhesion amount and the described formula (1). In the step of producing the separator 16, the separator 16 having a set density may be produced.

In the step of producing the capacitor element 4, the terminal leads 6 are connected to the positive electrode foil 12 and the negative electrode foil 14, respectively. A first separator 16 is disposed between the positive electrode foil 12 and the negative electrode foil 14, and a second separator 16 is disposed outside the positive electrode foil 12 or the negative electrode foil 14. The positive electrode foil 12, the negative electrode foil 14, and the first and second separators 16 are wound to produce the capacitor element 4.

In the step of sealing the capacitor element 4, the capacitor element 4 impregnated with an electrolyte such as an electrolytic solution is inserted into the exterior case, and then the sealing member is attached to the opening of the exterior case to produce the capacitor 2.

First Experimental Example

In the first experiment, the conduction resistance of an experimental separator 32 (FIG. 2) to which carbon 26 had been attached was confirmed. The carbon 26 is an alternative to falling carbon that falls off the carbon layer 20.

In order to produce the experimental separator 32 to which the carbon 26 was attached, slurries 1 to 10 having solid content concentrations listed in Table 1 were prepared. The components of the slurries 1 to 10 were as follows.
Carbon: carbon black powder
Binder: styrene-butadiene rubber
Dispersant: sodium carboxymethylcellulose aqueous solution
Diluent: pure water The amounts of the binder added and the dispersant added were sufficiently smaller than the amount of carbon added. Therefore, the amounts of solid contents in the slurries 1 to 10 can be regarded as equal to the amount of carbon.

TABLE 1

| Slurry No. | Solid content concentration [% by mass] | Carbon adhesion amount CA [μg/cm²] |
|---|---|---|
| Slurry1 | 0.00375 | 0.375 |
| Slurry2 | 0.0125 | 1.25 |
| Slurry3 | 0.0375 | 3.75 |
| Slurry4 | 0.125 | 12.5 |
| Slurry5 | 0.375 | 37.5 |
| Slurry6 | 0.50 | 50 |
| Slurry7 | 0.75 | 75 |
| Slurry8 | 1.0 | 100 |
| Slurry9 | 1.25 | 125 |
| Slurry10 | 2.5 | 250 |

Any one of the slurries 1 to 10 was uniformly dropped by 10 μL (microliter) onto a 1-centimeter square surface of the experimental separator 32, and the experimental separator 32 and the slurry were heated to 80° C. to obtain the experimental separator 32 to which the carbon 26 was attached. The experimental separator 32 is any one of the separators S1 to S18 (manufactured by NIPPON KODOSHI CORPORATION) listed in Table 2. The solid content concentration of the slurries 1 to 10 is low, and therefore the specific gravity of the slurries 1 to 10 can be regarded as equal to the specific gravity of water. Therefore, the carbon adhesion amount CA when 10 μL of each of the slurries 1 to 10 is dropped on the separator can be regarded as the amount listed in Table 1.

TABLE 2

| Separator No. (S No.) | Separator classification | Density [g/cm³] | Thickness [μm] | Product name |
|---|---|---|---|---|
| S1 | Kraft paper | 0.5 | 30 | PE2-30 |
| S2 | Kraft paper | 0.5 | 60 | PE2-60 |
| S3 | Kraft paper | 0.75 | 20 | PE4-20 |
| S4 | Kraft paper | 0.85 | 15 | PE5-15 |
| S5 | Kraft paper | 0.95 | 25 | PE95-25 |
| S6 | Kraft paper | 0.75 | 60 | PEDH-60 |
| S7 | Kraft paper | 0.75 | 30 | PXWDH75-30 |
| S8 | Manila paper | 0.5 | 30 | MER2-30 |
| S9 | Manila paper | 0.5 | 60 | ME2-60 |
| S10 | Manila paper | 0.35 | 50 | MR5D0.5-50 |
| S11 | Manila paper | 0.4 | 50 | MR5D1-50 |
| S12 | Manila paper | 0.45 | 50 | MR5D1.5-50 |
| S13 | Manila paper | 0.5 | 50 | MR5D2-50 |
| S14 | Chemical fiber paper | 0.28 | 40 | FZE28-40 |
| S15 | Special rayon | 0.45 | 30 | TEF45-30 |
| S16 | Special rayon | 0.45 | 40 | TEF45-40 |
| S17 | Special rayon | 0.45 | 50 | TEF45-50 |
| S18 | Special rayon | 0.5 | 70 | TEF50-70 |

The material of the separator was as follows.
Separators S1 to S6: kraft
Separator S7: kraft paper (high-density side)
Mixed paper of cotton linter and hemp (low-density side)
Separator S8: mixed paper of Manila hemp and esparto
Separator S9: Manila hemp
Separators S10 to S13: mixed paper of Manila hemp and esparto
Separator S14: mixed paper of nylon fibers and fibrillated acrylic fibers
Separators S15 to S18: special rayon
Polyvinyl alcohol (PVA) was coated on the surface facing the positive electrode foil of the kraft paper of the separator S7 and the mixed paper of the separator S14.

Figure 2:
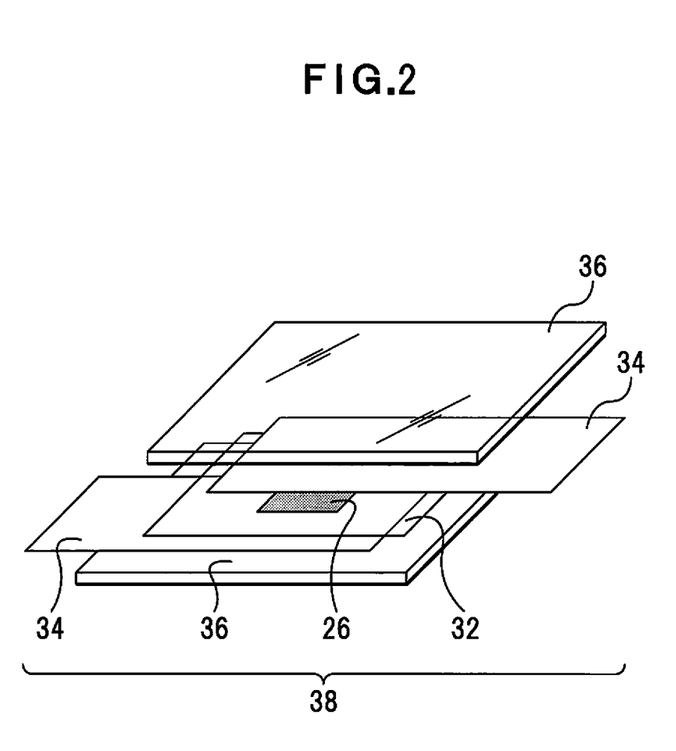
FIG. 2 is a diagram illustrating an experimental sample and measurement of conduction resistance.

FIG. 2 illustrates a measurement example of the conduction resistance. In FIG. 2, the fixing by a clip is omitted. The experimental separator 32 to which the carbon 26 was attached was sandwiched between two copper foils 34 from above and below, the experimental separator 32 and the copper foils 34 were sandwiched between two slide glasses 36, and the slide glasses 36 were fixed with a clip to obtain an experimental sample 38. The experimental separator 32 protruded outside at least one sheet of the copper foils 34 so that the two copper foils 34 were not in direct contact with each other.

An insulation resistance meter was connected to the two copper foils 34, and a resistance value (conduction resistance value) of the experimental sample 38 was measured. In the portion where only the experimental separator 32 was disposed between the copper foils 34, the resistance value was out of the measurement range, for example, 500 MΩ (megaohm) or more. Therefore, by measuring the resistance value of the experimental sample 38, the effect of the carbon 26 on the insulation of the separator can be grasped.

Figure 3:
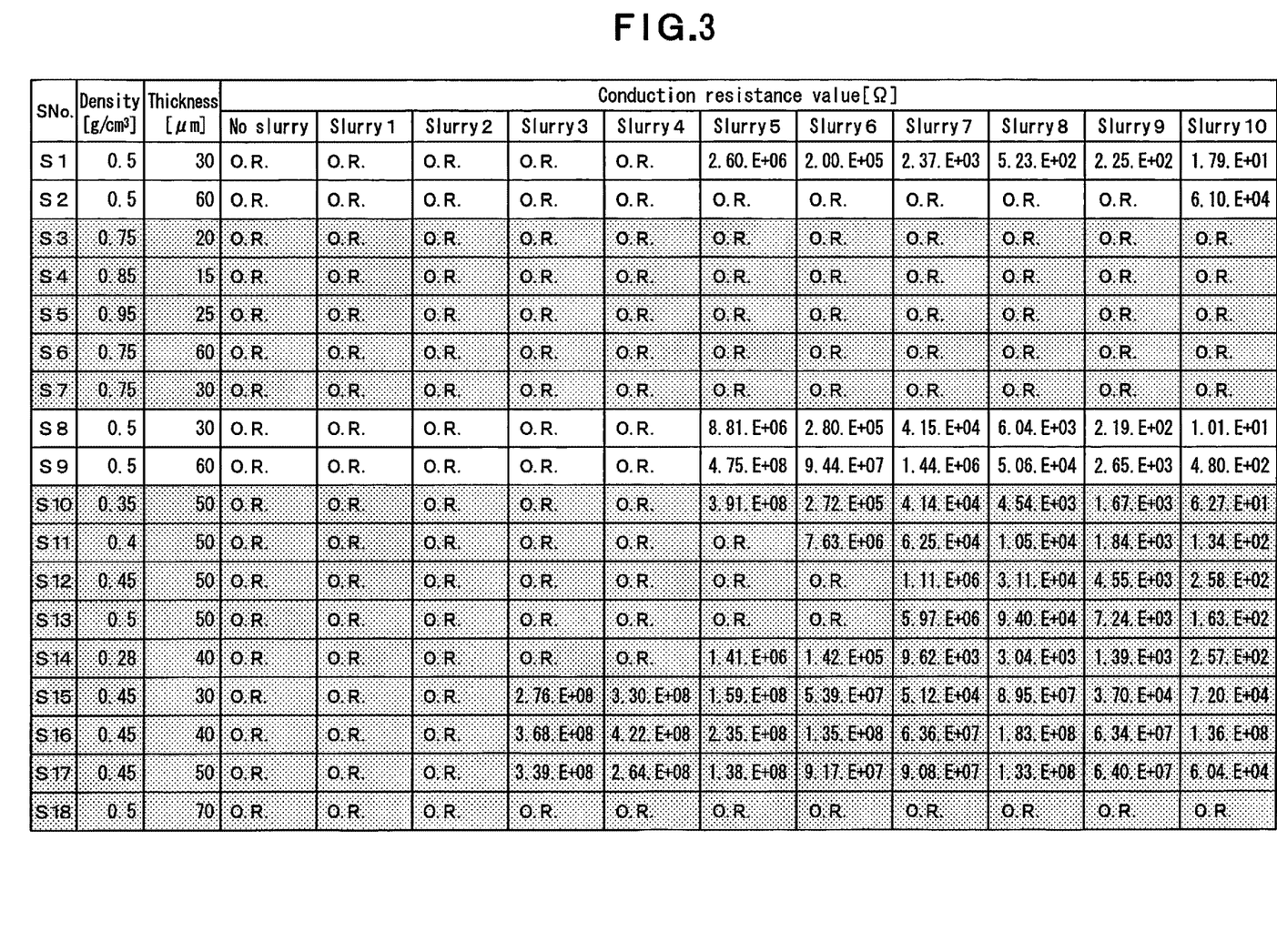
FIG. 3 is a table illustrating conduction resistance values of experimental samples.
Figure 4:
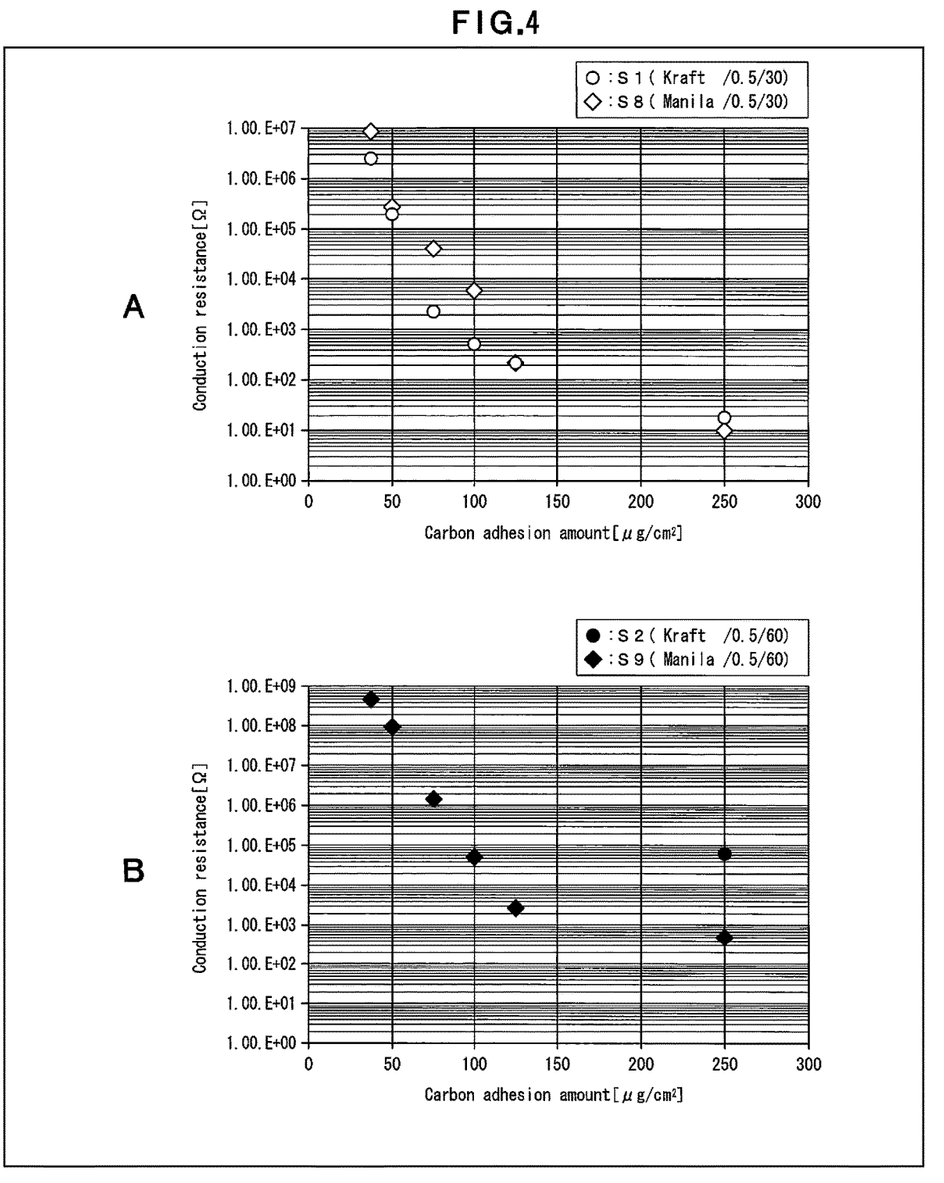
FIG. 4 is a graph of conduction resistance values of experimental samples.

FIG. 3 is a table of conduction resistance values of experimental samples. A of FIG. 4 and B of FIG. 4 are graphs of conduction resistance values of experimental samples. A of FIG. 4 illustrates the conduction resistance value of the experimental sample 38 including the separators S1 and S8, and B of FIG. 4 illustrates the conduction resistance value of the experimental sample 38 including the separators S2 and $9. In FIG. 3, "O.R." is an abbreviation of "out of range" indicating that the conduction resistance value is more than 500 MΩ and is out of the measurement range. In FIG. 3, for example, 1 MΩ and 100 MΩ are represented as "1.00. E+06" and "1.00. E+08", respectively.

In the first experiment, it was found from the table illustrated in FIG. 3 that the conduction resistance values of the separators $2 to S7 (kraft paper) were high. Excluding the results of the low-density (0.5 g/cm³) and thin (30 μm) separator S1 and the thickest separator S18, it was found that only the kraft separators S2 to $7 had conduction resistance values of all "O.R." (out of the measurement range), that is, more than 500 MΩ at the carbon adhesion amount CA in the range of 0 to 125 μg/cm². In the kraft separators S2 to $7, it is considered that the carbon powder did not permeate from the front surface to the back surface of the separators, and it is considered that the insulation was not deteriorated.

In A of FIG. 4, the separators S1 and S8 (density: 0.5 g/cm³) having different materials and a thickness of 30 μm are compared, and in B of FIG. 4, the separators S2 and S9 (density: 0.5 g/cm³) having different materials and a thickness of 60 μm are compared. From the graph illustrated in A of FIG. 4, it was found that, at a thickness of 30 μm, the conduction resistance values of the separator S1 (kraft paper) and the separator S8 (Manila paper) were slightly different from each other, but were generally close to each other. No large difference was observed between the separator S1 and the separator S8. However, from the graph illustrated in B of FIG. 4, it was found that the separator S2 (kraft paper) had a larger conduction resistance value than the separator S9 (Manila paper) at a thickness of 60 μm and a carbon adhesion amount CA of 37.5 μg/cm² or more. In particular, the separator S2 (kraft paper) indicated "O.R." (out of the measurement range) at a carbon adhesion amount CA of 125 μg/cm² or less, and it is found that the separator S2 has a remarkable effect. In the first experiment, it is found that the kraft separator is superior in insulation to the Manila separator.

It was found that the separator S9 (thickness: 60 μm) had a larger conduction resistance value as a whole than the separator S2 (thickness: 30 μm) for Manila paper at a density of 0.5 g/cm³. It is considered that the thickness of the separator affects the conduction resistance value.

It was found that, for kraft paper at a density of 0.5 g/cm³, the conduction resistance value of the separator S1 (thickness: 30 μm) greatly decreased due to the increase in the carbon adhesion amount CA, whereas the conduction resistance value of the separator S2 (thickness: 60 μm) hardly decreased. In the thin separator S1, it is considered that pinholes in the separator affect the conduction resistance value.

The following experimental results were obtained from the first experiment.

Kraft separator: in a separator having a large thickness or density, the conduction resistance value hardly decreased. That is, the effect of pinholes is small, and the carbon 26 is not transmitted. In a separator having a small thickness and density, the conduction resistance value decreases at once. That is, the carbon 26 easily permeates due to the effect of the pinholes.

Manila separator: the carbon 26 hardly permeates in proportion or almost proportion to the thickness or density. When the thickness or density is lower than a certain value, a phenomenon that the conduction resistance value is lowered at once is not observed.

When the separator has the same density (0.5 g/cm³) and the same thickness (30 μm), the conduction resistance values of both the kraft separator and the Manila separator decrease to the same extent. However, when the separator has the same density (0.5 g/cm³) and the same thickness (60 μm), the kraft separator has a higher conduction resistance value than the Manila separator. Therefore, according to the first experiment, using the kraft separator 16 in the capacitor 2 including the carbon layer 20 can be expected to provide a large short-circuit suppressing effect between the electrodes.

Second Experiment Example

In the second experiment, in order to confirm a preferable range of the density of the separator 16, the sheet resistance difference of the experimental separator 32 to which the carbon 26 had been attached described in the first experiment was confirmed. The experimental separator 32 to which the carbon 26 had been attached was similar to that in the first experiment, and the description thereof will be omitted.

The sheet resistances (surface resistivity) of first and second surfaces of the experimental separator 32 to which the carbon 26 had been attached were measured, and the difference in the sheet resistances (hereinafter, referred to as "sheet resistance difference") was determined. Herein, the first surface was a surface to which the slurry was applied and to which the carbon 26 was attached, and the second surface was a surface opposite to the first surface.

The sheet resistance of the first surface was measured by putting a four-point probe of the following resistivity meter to the center portion of the carbon 26. The sheet resistance of the second surface was measured by putting a four of the following resistivity meter to a portion corresponding to the center portion described above.

Figure 5:
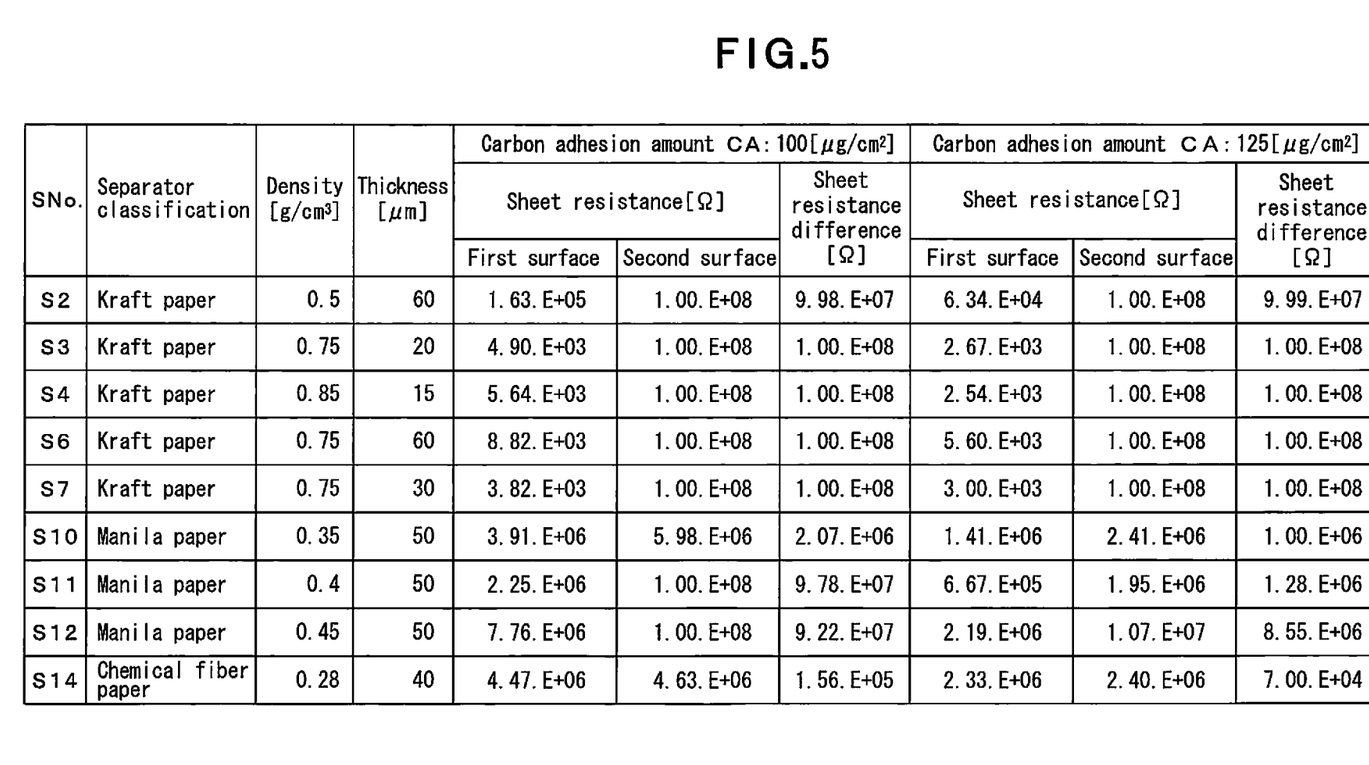
FIG. 5 is a table of the sheet resistance and the sheet resistance difference of experimental separators to which carbon is attached.
Figure 6:
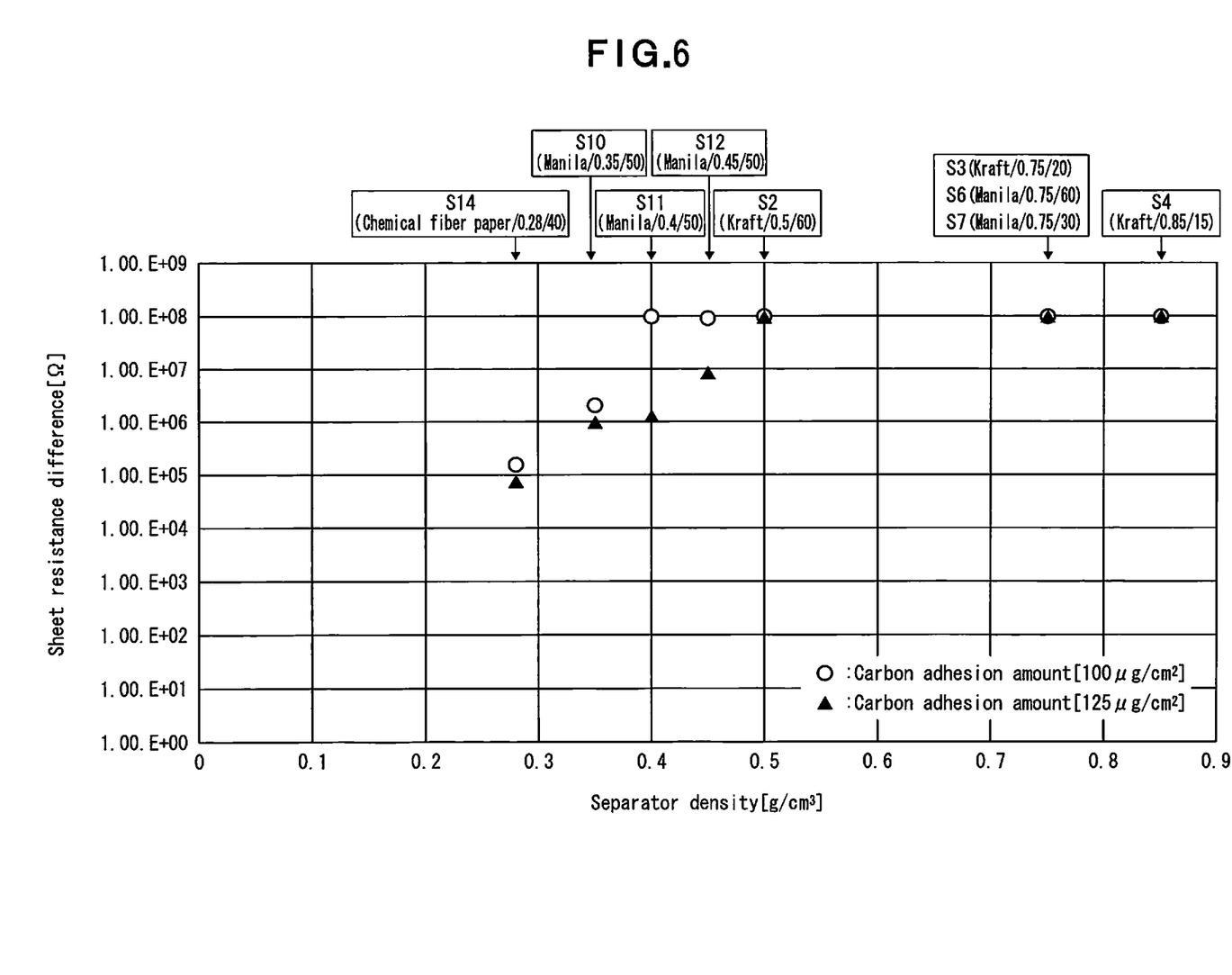
FIG. 6 is a graph of a sheet resistance difference of the experimental separators to which carbon is attached.

Resistivity meter
  Measuring instrument: Loresta GP
  Model: MCP-T600
  Measurable range: 100 MΩ/sq. or less FIG. 5 is a table of the sheet resistance and the sheet resistance difference of experimental separators to which carbon was attached. FIG. 6 is a graph of a sheet resistance difference of the experimental separators to which carbon was attached. FIGS. 5 and 6 illustrate experimental results of the separators $2, S3, S4, S6, S7, S10, S11, $12, and S14.

In the second experiment, when the carbon adhesion amount CA was 100 μg/cm², it was found that the separators S2, S3, S4, S6, S7, S11, and S12 having a density of 0.4 g/cm³ or more indicated a high sheet resistance difference by the same extent. In addition, in the second experiment, when the carbon adhesion amount CA was 125 μg/cm², it was found that the separators S2, S3, S4, S6, and S7 having a density of 0.5 g/cm³ or more indicated a high sheet resistance difference by the same extent. According to the second experiment, the sheet resistance differences of the experimental separators 32 were maximized or substantially maximized at the densities represented by the above-described formulas (1) and (4), and a capacitor excellent in short-circuit suppression can be obtained regardless of the classification or thickness of the separators.

According to the above embodiment, for example, the following effects can be obtained.

(1) The kraft separator 16 can provide a larger short-circuit suppressing effect than the separators 16 of other paper types having the same density and the same thickness as the kraft separator 16. Therefore, the kraft separator 16 has a qualitatively different effect of suppressing a decrease in insulation due to carbon attached to the separator, and is more suitable for the capacitor 2 including the negative electrode foil 14 in which the carbon layer 20 is formed, than the other separators 16.

(2) When the separator 16 has a density of $4.0 \times 10^{-3} \times$ WPA or more, the separator 16 can provide a large short-circuit suppressing effect between the electrodes of the capacitor 2 in various types and in a wide range of thickness. The separator 16 having such a density has a qualitatively different effect of suppressing a decrease in insulation due to carbon attached to the separator, and is suitable for the capacitor 2 including the negative electrode foil 14 in which the carbon layer 20 is formed.

Features and modifications of the embodiments described above will be listed below.

(1) In the embodiment described above, the capacitor element 4 is a wound element. However, the capacitor element 4 may be, for example, a laminated element in which a plurality of flat positive electrode foils, negative electrode foils, and separators are laminated.

(2) The materials of the positive electrode foil 12, the negative electrode foil 14, the separator 16, the exterior case, the sealing member, and the electrolyte are not limited to those described in the above embodiments. These materials may be other materials employed in aluminum electrolytic capacitors or similar capacitors. For example, a capacitor element may be formed by sandwiching a separator between a positive electrode foil and a negative electrode body to which aluminum tab-shaped lead terminals are ultrasonically connected respectively and by winding them. A phenol laminated plate to which external terminals are attached may be used as a sealing member, lead terminals led out from the capacitor element may be connected to the external terminals of the sealing member respectively after the capacitor element is impregnated with an electrolytic solution, or the capacitor element and the sealing member may be inserted into an exterior case and sealed with the sealing member. The material of the carbon layer 20 is not limited to that described in the above embodiments. The material forming the carbon layer 20 may be an optional conductive member.

(3) The separator 16 may include a member other than the described separator member. The separator 16 may include, for example, separated carbon separated from the negative electrode foil 14 on a negative-electrode side surface in contact with the negative electrode foil 14. The separator 16 described in the above embodiments can maintain the insulating function of the separator 16 even if the carbon 26 such as the separated carbon is attached. From the first experiment described above, it is found that when the carbon adhesion amount CA is less than 37.5 g/cm², the conduction resistance value of all experimental samples 38 becomes 100 MΩ or more. That is, as long as the carbon adhesion amount CA is less than 37.5 μg/cm², the effect of the separator 16 on the function of the capacitor 2 can be reduced. The separated carbon may be disposed on the entire negative-electrode side surface or may be partially disposed on the negative-electrode side surface.

The amount of carbon attached to the separator 16 can be specified by, for example, the following method. That is, the separator 16 taken out from the capacitor 2 is washed with, for example, ethanol to remove the electrolytic solution from the separator 16. The separator 16 from which the electrolytic solution has been removed is dried. The dried separator 16 is thermally analyzed by, for example, an existing analysis method such as thermogravimetric analysis (TGA) or thermogravimetry-differential thermal analysis (TG-DTA) to determine the adhesion amount (weight or mass) of the carbon 26. By dividing the obtained weight or mass by the analyzed area of the separator 16, the amount of carbon per square centimeter of the separator can be specified.

As described above, the most preferable embodiments and the like of the present disclosure have been described. However, the present disclosure is not limited to the above description, and it goes without saying that various modifications and changes can be made by those skilled in the art based on the gist of the invention described in the claims or disclosed in the description, and it goes without saying that such modifications and changes are included in the scope of the present disclosure.

INDUSTRIAL APPLICABILITY

The technology of the present disclosure can be used for insulation of an electrode including a conductive member such as carbon, and is useful.

REFERENCE SIGNS LIST

2 CAPACITOR
4 CAPACITOR ELEMENT
6 TERMINAL LEAD
12 POSITIVE ELECTRODE FOIL
14 NEGATIVE ELECTRODE FOIL
16 SEPARATOR
18 MAIN BODY FOIL
20 CARBON LAYER

The invention claimed is:

1. A capacitor comprising:
a positive electrode foil;
a negative electrode foil; and
a separator disposed between the positive electrode foil and the negative electrode foil, wherein
the negative electrode foil includes a carbon layer,
the separator is in contact with the carbon layer,
the separator includes separated carbon that is separated from the carbon layer, wherein the separated carbon is adhered to the separator,
the separator has a density [symbol: ρ, unit: g/cm³] satisfying the following formula:

$$\rho \geq 4.0 \times 10^{-3} \times WPA$$

where WPA is an amount of carbon per square centimeter of the separator [unit: μg/cm²], and
the amount of carbon is a set adhesion amount of the separated carbon or an actual carbon adhesion amount of the separated carbon.

2. The capacitor according to claim 1, wherein the separator is a kraft separator in contact with the carbon layer.

3. The capacitor according to claim 2, wherein
the amount of carbon is the set adhesion amount, and
the separator includes the separated carbon equal to or less than the set adhesion amount on a negative-electrode side surface in contact with the negative electrode foil.

4. The capacitor according to claim 3, wherein the separated carbon adheres only to the negative-electrode side surface.

5. The capacitor according to claim 4, wherein the separated carbon is disposed on the entire negative-electrode side surface or partially disposed on the negative-electrode side surface.

6. The capacitor according to claim 3, wherein the separated carbon is disposed on the entire negative-electrode side surface or partially disposed on the negative-electrode side surface.

7. The capacitor according to claim 1, wherein
the amount of carbon is the set adhesion amount, and
the separator includes the separated carbon equal to or less than the set adhesion amount on a negative-electrode side surface in contact with the negative electrode foil.

8. The capacitor according to claim 7, wherein the separated carbon adheres only to the negative-electrode side surface.

9. The capacitor according to claim 8, wherein the separated carbon is disposed on the entire negative-electrode side surface or partially disposed on the negative-electrode side surface.

10. The capacitor according to claim 7, wherein the separated carbon is disposed on the entire negative-electrode side surface or partially disposed on the negative-electrode side surface.

11. A manufacturing method for a capacitor comprising:
producing a positive electrode foil;
producing a negative electrode foil including a carbon layer;
setting a set adhesion amount of separated carbon to a separator, the separated carbon being separated from the carbon layer, and setting a density [symbol: p, unit: g/cm3] of the separator from the set adhesion amount so that the density of the separator satisfies the following formula:

$$\rho \geq 4.0 \times 10^{-3} \times WPA$$

where WPA is the set adhesion amount per square centimeter of the separator [unit: μg/cm$^2$];
producing the separator having the density; and
disposing the separator between the positive electrode foil and the negative electrode foil.

* * * * *